United States Patent [19]

Montgomery et al.

[11] Patent Number: 4,947,685
[45] Date of Patent: Aug. 14, 1990

[54] SYSTEM FOR MEASURING THE REPEAT LENGTH OF A MOVING WEB

[75] Inventors: Robert M. Montgomery, Indialantic, Fla.; Robert A. Dessert; Dinesh G. Punater, both of Dayton, Ohio

[73] Assignee: AM International, Inc., Chicago, Ill.

[21] Appl. No.: 418,047

[22] Filed: Oct. 6, 1989

[51] Int. Cl.⁵ ............................................. G01B 11/04
[52] U.S. Cl. .................................... 73/159; 364/562; 226/28; 226/27
[58] Field of Search ................... 73/159; 226/27, 28, 226/29; 364/561, 562

[56] References Cited

U.S. PATENT DOCUMENTS

| | | | |
|---|---|---|---|
| 3,264,984 | 8/1966 | Smith, Jr. | 101/227 |
| 3,280,737 | 10/1966 | Huck | 101/181 |
| 3,548,747 | 12/1970 | D'Amato | 101/153 |
| 3,559,568 | 2/1971 | Stanley | 226/28 |
| 3,581,071 | 5/1971 | Payseure | 364/562 |
| 3,673,418 | 6/1972 | Wiig | 226/27 |
| 3,677,177 | 7/1972 | Smith, Jr. | 101/128 |
| 3,841,216 | 10/1974 | Huffman | 101/181 |
| 4,129,238 | 12/1978 | Herd | 226/29 |
| 4,482,972 | 11/1984 | Lewis et al. | 226/87 |
| 4,512,256 | 4/1985 | Schriber et al. | 101/248 |
| 4,552,608 | 11/1985 | Hoffmann et al. | 226/27 |
| 4,757,930 | 7/1988 | Ditto | 226/27 |
| 4,781,317 | 11/1988 | Ditto | 226/29 |
| 4,782,987 | 11/1988 | Giacomelli et al. | 226/27 |
| 4,839,674 | 6/1989 | Hanagata et al. | 226/27 |

FOREIGN PATENT DOCUMENTS 0077570  4/1983  European Pat. Off. ............. 226/27

Primary Examiner—William A. Cuchlinski, Jr.
Assistant Examiner—Diego F. F. Gutierrez
Attorney, Agent, or Firm—Biebel, French & Nauman

[57] ABSTRACT

A method and apparatus for measuring the repeat length (L) of a moving web includes forming a plurality of detectable marks along the length of the web at a repeated length interval. First and second detectors positioned along the web path are separated by a known distance (S). The repeat length of the web is obtained by detecting a mark moving past the first detector and then detecting a mark moving past the second detector, determining the time (t) separating the detections, and measuring the speed of the moving web (V), wherein the repeat length is calculated using the formula L=S+Vt.

12 Claims, 3 Drawing Sheets

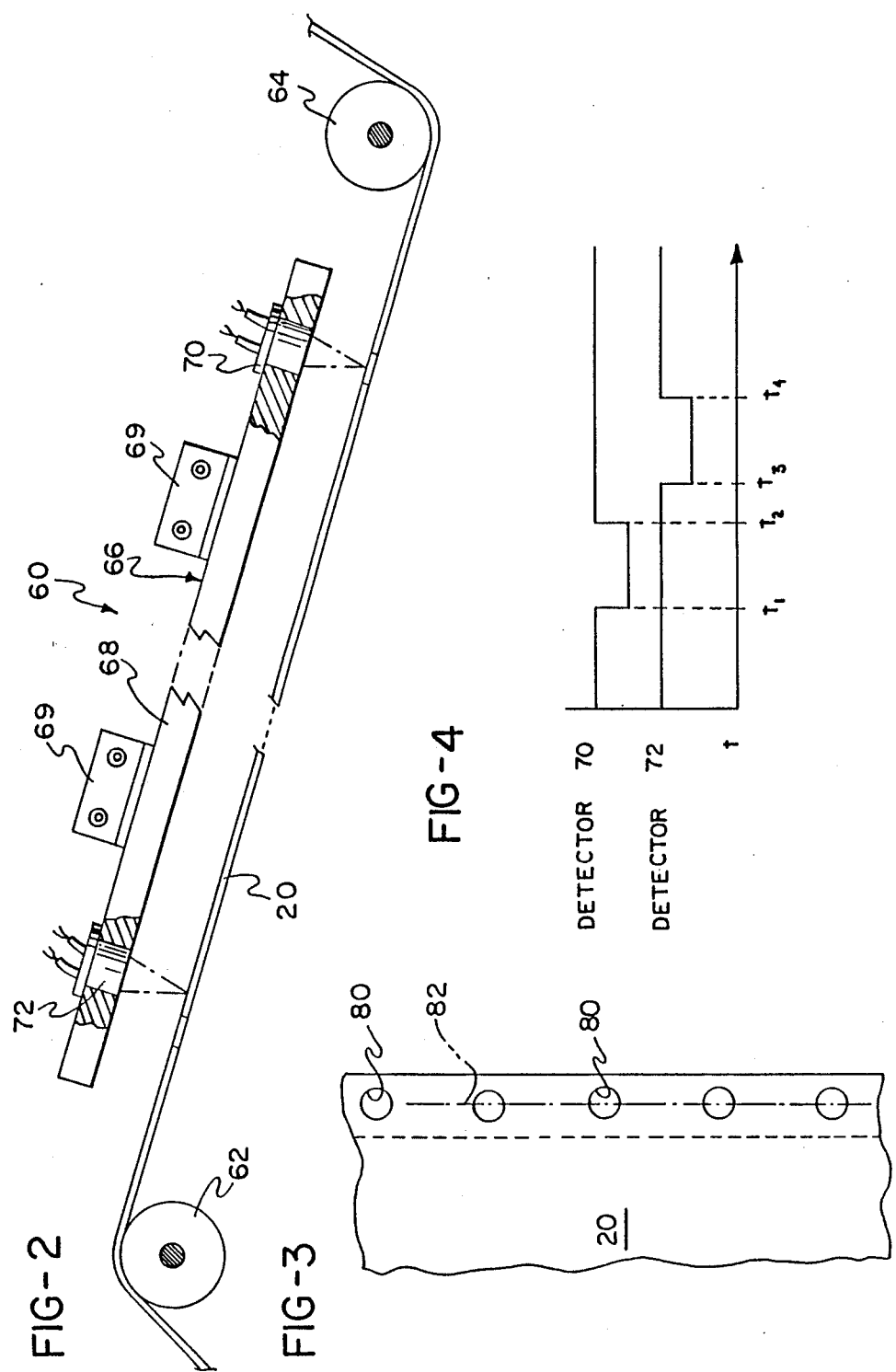

SYSTEM FOR MEASURING THE REPEAT LENGTH OF A MOVING WEB

BACKGROUND OF THE INVENTION

The present invention relates generally to measuring a repeat length on a moving web, and more particularly, to such measurements which are made in connection with the printing and assembling of the various parts of a multi-part business form.

Multi-part business forms are common in a wide variety of environments. Such forms comprise multiple parts or layers secured together for use in recording information, typically used to provide multiple copies of the completed form. Such forms are preprinted and commonly include a series of equidistant spaced line holes positioned near each margin of the form, so that the forms can be handled in automated printing equipment and the like. Further, it is typical to provide such forms with various perforations, file holes positioned near the upper edge of each form, sequential numbering of forms, and the like.

When such multi-part forms are manufactured, each part or layer is individually prepared in a specialized press generally known as a forms press. One example of such a press is shown in U.S. Pat. No. 4,512,256. Web material is drawn into the press from a supply roll, and as the web moves through the press, various operations are performed on the web. Such operations can include printing, hole punching, perforating, numbering and the like. As the web emerges from the press, it is rewound onto a take-up or rewind roll.

Once each part has been prepared, the rewind rolls carrying the various parts are loaded into a collator, which draws the part webs into the apparatus, assembles the parts their multi-layer configuration, and secures the parts together. Since each part is prepared with a series of equidistant line holes near each side edge of the part web, an elongated pin conveyor is provided within the collator for use in assembling the parts. Each individual web is directed onto the pin conveyor as the completed multi-layer stack of the form is built.

It should be clear that to produce the multipart form, each individual part must be of a uniform repeat length, both with respect to the part itself, and with respect to the other parts of the form. Otherwise, the various parts may be misaligned when assembled, or may exhibit buckling within the different layers.

Repeat length of each web is, of course, established as the web moves through the press. Thus, the length must be controlled within the press. However, along the pin conveyor where the parts are assembled, and hence where repeat length becomes critical, the web is typically in a relaxed state with close to zero tension. The repeat length of interest is therefore the relaxed length of the web material as it is taken from the rewind roll into the collator.

Provided that the forms manufacturing environment is properly controlled, no significant change in web length will occur from the time that the web is wound onto the rewind roll in the press to the time that the web is unwound into the collator. Thus, if the relaxed repeat length of the web can be properly controlled within the press, the repeat length will be proper within the collator, where such uniformity becomes important. Techniques are known for adjusting the repeat length of the web as it first enters the press from the supply roll, but one cannot assume that the repeat length will remain uniform as the paper web passes through the press. Repeat length can change during the printing process, in part due to the addition of water (dampening liquid) used in lithographic printing, and this change will be retained within the rewind roll and thus into the collator. However, it is also not sufficient simply to measure the repeat length as the web exits the press and thereby control web movement through the press to regulate repeat length. Because the relaxed repeat length is critical within the collator, measuring the repeat length of the tensioned, moving web is not adequate for ensuring that the various webs will perform properly in the collator.

What is needed, therefore, is a system for determining the relaxed repeat length of the web moving through the web press. This measurement information can be used to control infeed from the supply roll of the web into the press so as to adjust the repeat length. As a result of controlling relaxed repeat length of the web as it exits the press, proper registration among webs comprising a multi-part business form can be achieved in a collator.

SUMMARY OF THE INVENTION

The present invention, therefore, provides a novel system for determining the relaxed repeat length within a moving web. The system is able to make such determination in a web emerging from a business forms press, so corrections can be made at the web infeed to the press to counteract trends towards changes in the repeat length.

In making such measurements, the present invention determines relaxed repeat length using measurements made of the tensioned web. In essence, this approach is based upon applying two tensioning forces of a known ratio to the moving web, and determining the repeat length of the web under each of the two tensioning forces. On the basis of the information collected, the relaxed repeat length can be extrapolated.

In addition, the present invention provides a method for measuring the repeat length of the moving web regardless of the tensioning force applied thereto. The method relies upon the line holes which are previously formed in the web, and enables the length determination to be made rapidly so the necessary adjustments in the press can be made as quickly as possible to minimize the amount of web which is operated upon prior to corrective action.

In accordance with the invention, then, the method of measuring a repeat length L of a web moving along a web path includes forming a plurality of detectable marks along the length of the web. The marks are formed at a repetitive length interval, the length interval being selected such that the repeat length is an integer multiple of the length interval. First and second detectors are positioned along the web path to be separated by a known distance S. Each detector is sensitive to movement there past of one of the detectable marks.

The speed of the moving web V is measured, and the first detector is used to detect the movement of a mark there past. The second detector then detects the next movement of a mark past the second detector, and the time interval t separating the two detections is measured. The repeat length may then be calculated according to the relation $L = S + Vt$.

In addition, the present invention provides a method for measuring the relaxed repeat length of a web moving along the web path. Such a measurement is made by forming a plurality of detectable marks along the length of the web, with the marks being formed at a repeated length interval. Positioned along the web path are first and second detectors separated by a known distance S, each detector being sensitive to movement therepast of one of the marks. A first tensioning force is applied to the moving web. A first tensioned repeat length of the web is measured by detecting with the first detector the movement of a mark therepast, and afterwards detecting with the second detector the next movement of a mark therepast. The time separating the detections is determined.

A second tensioning force of a known proportional relationship X with respect to the first tensioning force is applied to the moving web. A second tensioned repeat length is measured by again detecting with the first detector the movement of a mark there past, and detecting with the second detector the next movement of a mark past that detector. The time separating the detections is again determined.

The speed of the moving web is measured, and a relaxed repeat length is calculated from the first tensioned repeat length, the second tensioned repeat length, and the proportional relationship between the first and second tensioning forces.

In determining the relaxed repeat length of the web, the first tensioned repeat length L1 is calculated using the method described herein such that $L1 = S + Vt1$. The second tensioned repeat length $L_1$ is similarly calculated according to the relation $L2 = S\ Vt2$. The relaxed repeat length $L_R$ is then calculated according to the relation $$X = \frac{1 - \frac{L_R}{L_1}}{1 - \frac{D_R}{L_2}}.$$

The detectable marks may be formed into the web by punching a hole into the web at the beginning of each of the length intervals to form a series of equally spaced holes along the length of the web. The holes may be punched into the web by a rotary line hole punch operating on the web.

In such a case, the first detector and the second detector each detect a hole by first detecting the movement therepast of a leading edge of the hole, detecting the movement therepast of a trailing edge of the hole, and determining the midpoint between the leading and the trailing edges.

As an alternative, the detectable marks may be formed into the web by printing a mark on the web at the beginning of each of the length intervals.

The first and second tensioning forces may be applied to the web by causing the web to pass around a roller supported by a supporting means. The first and second forces are applied to the supporting means to cause the forces to be transmitted through the roller normally to the web.

The invention also includes apparatus designed to carry out the method described herein.

Within such apparatus, tension is applied to the web through means including a roller, and means for supporting the roller connected to the frame for positioning the roller to cause the web to move around the roller along the web path. Force applied to the roller supporting means is transmitted through the roller normally to the web.

The roller supporting means may include a pair of arms, each of the arms having first ends attached to the roller, each of the arms being pivotally connected to the frame remote from the first end. The means for applying force to the roller supporting means applies force normally to the arms, or to at least one of them if they are appropriately coupled to pivot together.

The force applying means may include first and second air cylinders connected between the frame and at least one of the arms, and means for connecting the cylinders to a source of compressed air.

Accordingly, it is an object of the invention to enable proper control of repeat length within a moving web by providing a method and apparatus for measuring a repeat length along a moving web; to enable proper collating of single forms webs in assembling a finished multi-part form by providing a method and apparatus for measuring the relaxed repeat length of a web moving under tension along a web path; to provide such a method and apparatus which can provide such measurements as the web exits a web press and is wound onto a rewind roll; and to provide such a method and apparatus which can produce such measurement information without adversely affecting press operations.

Other objects and advantages of the present invention will be readily apparent from the following description, the accompanying drawings, and the appended claims.

BRIEF DESCRIPTION OF THE DRAWINGS

FIG. 2 is a side view of the detector assembly of the repeat length determining apparatus;

FIG. 3 is a top view of a portion of the web showing the path of detectable holes past the detector beams;

FIG. 4 is a plot showing typical output from the detectors;

DETAILED DESCRIPTION OF THE PREFERRED EMBODIMENT

Figure 1:
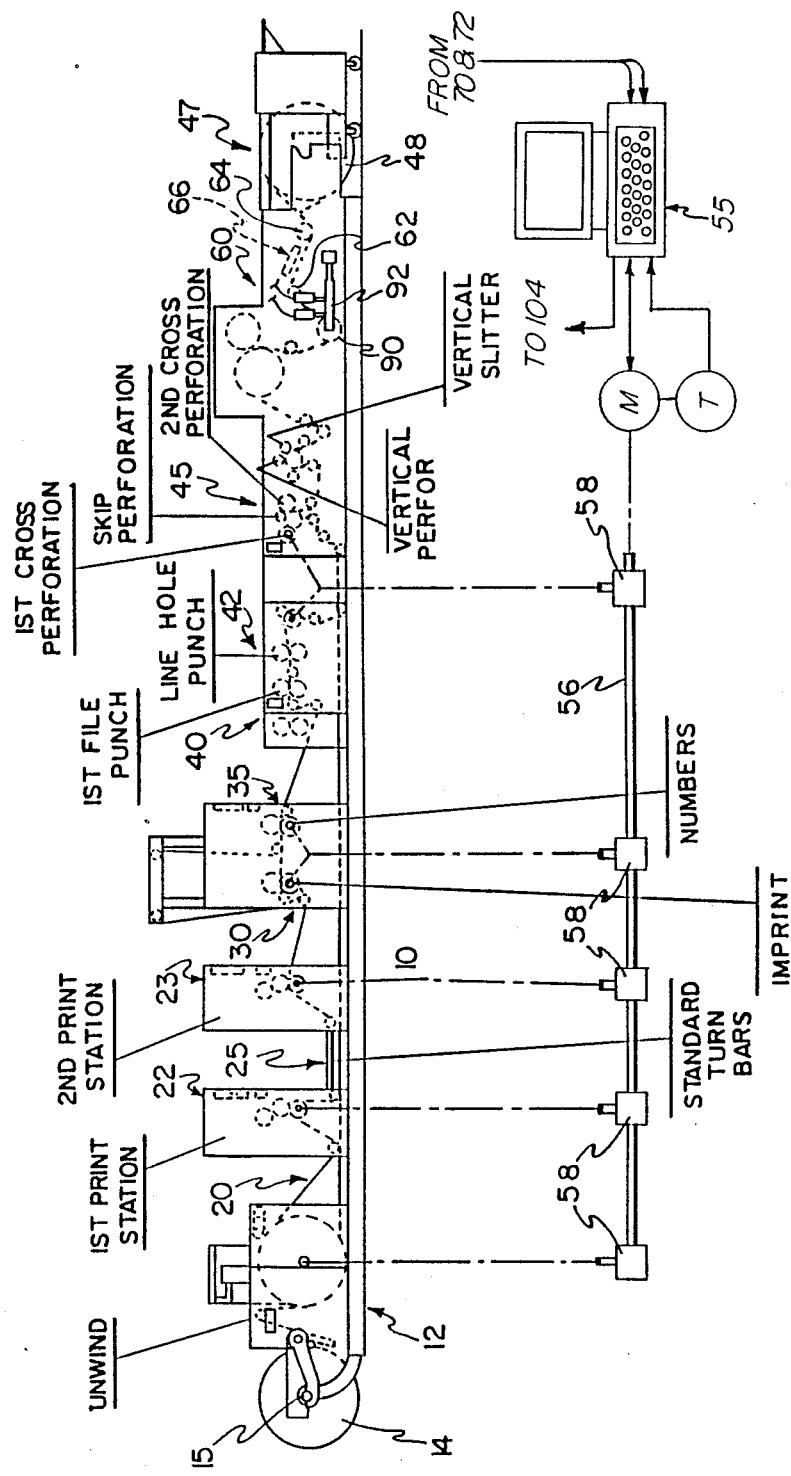
FIG. 1 is a side view of a conventional business forms press having included therein the apparatus for determining relaxed repeat length of the moving web in accordance with the present invention.

Referring generally to FIG. 1, a business forms press is shown which is typical of the type of press within which the present invention is intended to be used. The particular press is described in greater detail in U.S. Pat. No. 4,512,256, which is hereby incorporated by reference. However, as will be recognized from the following description, any press which operates upon the moving web can be used with the present invention.

The machine includes a base 10 supporting in longitudinal alignment a number of stations at which various operations are performed on a web of paper or like material in order to print, mark, and perforate the web repeatedly. Such machines are per se well known, with details of them shown, for example, in U.S. Pat. Nos. 3,249,316 and 3,250,258. The drive system, including the line shaft, gears and the like, is shown schematically for purposes of clarity, it being understood that such drive is conventional and is arranged in order to operate the rotating and other moving parts at the various stations of the machine in exact synchronism, such that operations formed at any station are in register with operations performed at any other station.

An unwind station 12 includes a support for the roll 14 from which the web is pulled, and also includes mechanism for assuring that the web is unrolled at synchronous speed and, as nearly as possible, under constant tension.

After unwind station 12, the web passes to first and second print stations 22 and 23 which include conventional printing cylinders and the like for printing repetitively on the web by means of lithographic offset, letter press, or other printing processes, as may be desired. Turning bars 25 are located between the print stations, so the web can optionally be threaded around the turn bars in order to reverse the surface of the web for the second print station 23, such an arrangement sometimes being referred to a back printing. Of course, the number of print stations can vary, depending upon the needs of the user.

Following the second print station, there is a station for performing an operation known in the forms printing art as "imprinting." This station is shown generally at 30, and can be generally described as a repetitive printing operation performed by one or more flexible letter-type plates, sometimes referred to as "patches," which are secured to the surface of a supporting cylinder in predetermined registered locations. The printing operation is generally similar to letter press printing, with ink appropriately being applied to the raised image areas of the imprint patches.

Following the imprint station, the web passes to a numbering station 35. Here, one or more numbering machines are mounted to print different number combinations on the web. Numbering machines are per se known, and function generally to change the number printed on successive portions of the web, either in straight numerical progression, reverse progression, or in some progression where certain numbers are skipped or repeated, depending upon the nature of the forms being printed.

After numbering, the web passes to the file punch station 40, where one or more rotary punch and die mechanisms may operate on the web to form "file holes" in the areas of the web. These holes are sometimes provided in business forms as a convenience to the user, being intended to receive posts, brads, or other retainers to hold the separated sheet or form in a file. The holes may be located at any convenient point within the area of the form, depending upon the needs of the user.

After the file punch station, the web is threaded through a line hole punch station wherein appropriate rotary punches and dies can form "line holes," usually in marginal regions of the forms. These holes are needed particularly in forms intended for use in autographic registers; computer printers or the like; also in multi-part forms made up of several webs. Webs prepared in this machine may subsequently be combined with similar webs in a collating machine which uses the holes to register the several webs. Thus, in the case of multi-part forms, the several webs or parts are assembled on a pin conveyor within the collator, the parts being under zero tension. The pin conveyor operates in cooperation with the line holes formed at station 42.

Following the line hole station 42, a perforating station 45 incorporates several different types of perforators and/or slitter devices for forming partition lines both cross-wise and lengthwise of the web. The first part of the perforating station may incorporate a cylinder containing cross perforator blades, followed by small slitter wheels arranged to contact the web intermittently, these usually being known as skip perforators. Skip perforators may then be followed by a second cross perforator cylinder, and subsequently by one or more vertical perforators which perform lengthwise discontinuous slits or cuts in the web. Lastly, slitter wheels which make continuous lengthwise slits in the web may be provided.

At this station, operations on the web are essentially complete. The finished web is therefore directed to a rewind station 47, where it is rewound onto a take-up roll 48 to be carried away on any convenient device to the collating machine.

The various stations are driven at the same speed from a variable speed motor M via line shaft 56 and gear boxes 58. Clutches (not shown) are conventionally connected between the gear boxes and the various stations to allow for selective connection of power to each of them. The press is controlled by a conventional computer controller system, illustrated with its console and terminal at the general reference numeral 55. The controller is connected to motor M, to regulate its speed to a selected rev./min., and as part of that control a tachometer T which senses motor (and thus line shaft) speed and provides an appropriate signal to the controller system.

It is critical to successful assembly of the multiple webs into a multi-part form that the parts be of uniform relaxed repeat length. Once the web is wound onto rewind roll 48, it will retain the relaxed repeat length of the web as it exits the press, provided that the roll 48 has been properly handled. Because it is at this stage of press operations that the length of interest is located, a repeat length measuring station 60 is located immediately ahead of rewind station 47 within the press. At station 60, the relaxed repeat length is determined, and changes in tension can be made at the unwind station 12 to effect the tension of the web entering the press so as to correct any tendency of the repeat length to vary.

While the relaxed repeat length is the actual measurement of interest, it is necessary in accordance with the invention to measure the tensioned repeat length in order to determine the relaxed length. The means for measuring the repeat length of the moving web can be seen by reference to FIG. 2.

As web 20 moves through the length measuring station 60, it passes over roller 62 and beneath roller 64. Adjacent the web path between rollers 62 and 64 is a length scanner 66 which includes a scanner frame 68 formed by an elongated bar which is connected by appropriate means 69 to the press side frame (not shown). Positioned along frame 68 are first and second photodetectors 70 and 72, respectively. Each detector 70 and 72 is preferably a photodiode detector having an integrally mounted LED source which is focused onto the surface of the web 20 passing beneath the scanner assembly 66. Detectors 70 and 72 are fixed to scanner frame 68 at a precise predetermined spacing. The outputs of the detectors are directed to the controller system, as indicated in FIG. 1.

A section of the web 20 is shown in FIG. 3. There, it can be seen that a series of line holes 80 are positioned along the margin of the web 20, the holes 80 being formed for example at ½" intervals. Length scanner 66

(FIG. 2) is positioned over web 20 such that the beams directed from detectors 70 and 72 trace a path 82 along the moving web 20. Each scanner therefore detects the discontinuity of the line holes on the paper web. Each detector, by recording the change in response from the web surface to the line hole 80, will register both the leading edge and the trailing edge of the hole. This will produce a pulse representative of the entire hole passing beneath the detector. The mid-point of the pulse is determined and taken as the hole center. By such an approach, allowances can be made for lateral web movement during detection which may cause the detector path over the line holes 80 to be located off-center of the holes.

A typical signal output for detectors 70 and 72 can be seen in FIG. 4. Considering initially the output of detector 70, as web paper passes beneath the detector, the reflection of the LED light beam is detected producing a high output. As the leading edge of a line hole passes beneath the detector at a time $t_1$, the beam is no longer reflected and a low output is produced by the detector. As the trailing edge of the hole moves past at a time $t_2$, the output again becomes high. Thus, the hole center can be determined as passing the detector at a time $(t_1+t_2)/2$. A similar output occurs for detector 72.

In making a repeat length determination of the moving web, the distance separating line holes 80 is determined. Generally, the nominal value for this distance will be known, since the nominal line hole spacing is known, having a typical value of 0.50 inches. The nominal repeat length L of the web is established as some integer multiple of the distance between successive line holes 80.

Detectors 70 and 72 are separated along scanner frame 68 by a known distance s, which distance is slightly less than the nominal repeat length L of the web, by an amount equal to less than one increment between line holes. Appropriate means are provided for measuring the velocity V of the moving web. Such velocity measuring instruments are well known, for example a magnetic or other sensor located on the press drive for determining rotational speed of the elements moving the web through the press.

Figure 5:
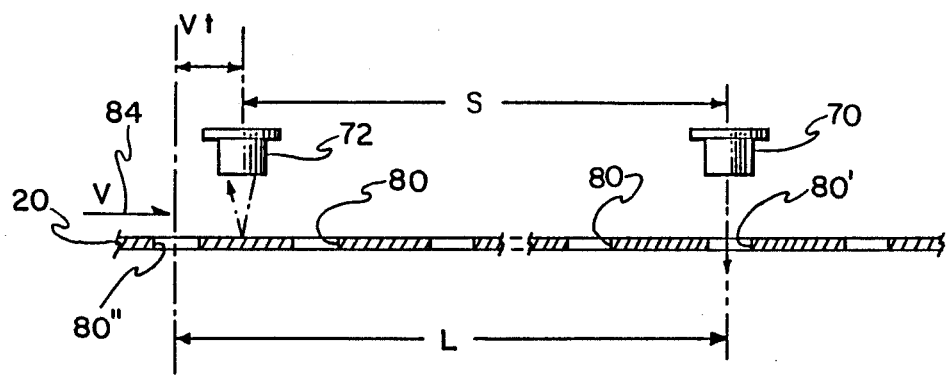
FIG. 5 is a schematic side view illustrating the measurement of the repeat length of the web in accordance with the present invention.

Referring to FIG. 5, web 20 moves beneath detectors 70 and 72 in a direction indicated generally by arrow 84 at a web velocity V. When a repeat length is to be measured, first detector 70 detects the passage of the next line hole 80' beneath the detector. The web is shown in this position in FIG. 5. Because second detector 72 is located a distance S from first detector 70 which is less than the nominal repeat length L, which is in turn defined by an integer number of nominal line hole spacing increments, second detector 72 will not be detecting the presence of a line hole at the time detector 70 is detecting line hole 80'.

As the web continues to move, however, second detector 72 will note the presence of the next line hole 80" to pass it. The time interval t between the detection of line holes 80' and 80" by detectors 70 and 72, respectively, is measured by controller system 55. The distance which the web has moved with respect to detector 72 during this time interval can then be calculated as Vt. Thus, it can be seen that the repeat length L can be calculated as S+Vt. This calculation can readily be made by the computerized controller system.

The total length over which the repeat length determination is made can be relatively long using two detectors. Thus, any error in the measurement of the distance Vt represents a very small percentage of the total repeat length L. Accordingly, system accuracy is greatly improved.

Figure 6:
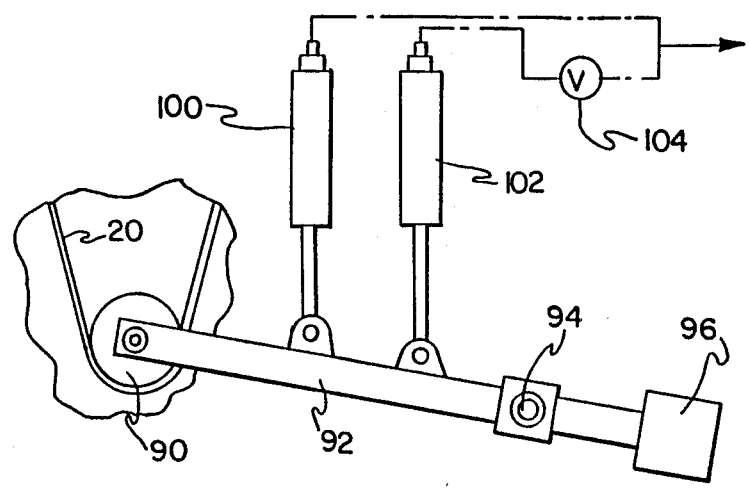
FIG. 6 is a side view of the mechanism for applying tension to the moving web.

For collating of parts of a multi-part form, the repeat length measurement so determined represents a tensioned repeat length, while the relaxed repeat length of the web is the measurement of interest. Accordingly, the present invention provides a means by which such tensioned repeat length measurements can be extrapolated to provide a relaxed repeat length value. Thus, referring briefly back to FIG. 1, immediately prior to passage by length scanner 66, the web passes around a roller 90. Referring now to FIG. 6, roll 90 is supported between a pair of dancer arms 92 (only one shown.) Arms 92 are in turn pivotally connected to the press frame at 94. A counterweight 96 is located at the end of arm 92 opposite roller 90.

Connected to at least one dancer arm 92 is a pair of fixed pressure air cylinders 100 and 102. Cylinder 102 is connected through an appropriate valve 104 to a compressed air supply (not shown), and cylinder 100 is connected directly to such supply when the system is operable. As will be explained, valve 104 is actuated from the controller system to cause cylinder 102 to apply a downward force to dancer arm 92 in addition to the steady bias from cylinder 100. This in turn applies a tensioning force through roller 90 to web 20, thereby increasing the tension on the web, particularly as the web moves past the length determination scanner 66. Cylinders 100 and 102 are selected to have a known pressure ratio, but as will be seen, the specific pressure of the compressed air applied to either cylinder 100 or 102 is not important in the calculation of the relaxed repeat length of the web.

In operation, whenever relaxed repeat length is to be determined, cylinder 100 is actuated to apply a first tensioning force to the web 20. The repeat length of the tensioned web is then measured in accordance with the method described above, and the value stored in the controller system. Next, the second air cylinder 102 is actuated, thereby applying a second and different tensioning force to the web. A second repeat length measurement is made, and also stored in the controller system.

The relaxed repeat length $L_R$ of the web may be determined from the measured quantities as follows. A tensioned repeat length L is related to the relaxed repeat length $L_R$ by the equation $$L_R = L\left(1 - \frac{T}{E}\right),$$

where T is the tension in the web and E is the elastic modulus. For repeat lengths $L_1$ and $L_2$ measured at the first and second tensions $T_1$ and $T_2$ applied as described above, then, $$\frac{T_1}{E} = 1 - \frac{L_R}{L_1} \text{ and } \frac{T_2}{E} = 1 - \frac{L_R}{L_2}$$

Because the first and second tensions $T_1$ and $T_2$ are created by the first and second pressures $P_1$ and $P_2$ applied through the air cylinders to the web, tensions $T_1$ and $T_2$ are related as $T_1/T_2 = P_1/P_2 = X$, where X is the known ratio between the cylinders. Thus, $$\frac{T_1}{T_2} = X = \frac{1 - \frac{L_R}{L_2}}{1 - \frac{L_R}{L_2}}$$

Since X, $L_1$ and $L_2$ are all known, the above equation can solved for $L_R$. Thus, the relaxed repeat length of the web is determined by the controller system from the known pressure ratio of the cylinders, and from the measured repeat lengths under the two different tensioning forces.

The information obtained regarding the repeat length can in turn be used to adjust the infeed of the web into the forms press as needed to correct the repeat length of the web. This is readily accomplished by the controller system, which normally controls the infeed adjustment, and simply accepts and uses this information as part of that function. Such infeed adjustment mechanisms are per se known in the art.

It should be recognized that a number of variations can be made to the described method and apparatus within the scope of the present invention. For example, it is not necessary that formed line holes along the web be sensed for length determination. What is required is some detectable characteristic along the web located at repeated intervals. For example, printed marks could be substituted for the line holes. In such a case, an appropriate mechanism can be installed on the press for positioning the printed marks at the required intervals. Alternatively, the marks can simply be printed along with other desired printing on the web as the web moves through any of the print stations.

Further, it is not necessary that the tensioning forces be applied to the web in precisely the manner shown herein. Other tensioning means could be used, but the ratio between the tensioning forces applied to the web must be known in order for the relaxed repeat length to be calculated.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method of measuring a repeat length L of a web moving along a web path, comprising the steps of:
    forming a plurality of detectable marks along the length of the web, said marks being formed at a nominal repetitive length interval along the web;
    a nominal value for said repeat length being selected such that said nominal repeat length is an integer multiple of said length interval;
    positioning along the web path first and second detectors separated by a known distance S, each detector sensitive to movement there past of one of said detectable marks;
    measuring the speed of the moving web V; detecting with said first detector the movement of a mark there past;
    detecting with said second detector the next movement of a mark there past;
    measuring the time interval t separating said detections; and
    calculating the repeat length according to the relation $L = S + Vt$.

2. A method as defined in claim 1, wherein said detectable marks are formed into the web by punching a hole into the web at the beginning of each of said length intervals to form a series of equally spaced holes along the length of the web.

3. A method as defined in claim 2, wherein said holes are punched into the web by a rotary line hole punch operating on the web.

4. A method as defined in claim 2, wherein said first detector and said second detector each detect the movement of one of said holes there past by first detecting the movement there past of a leading edge of said hole, detecting the movement there past of a trailing edge of said hole, and determining the midpoint between said leading and said trailing edges.

5. A method as defined in claim 1, wherein said detectable marks are formed into the web by printing a mark on the web at the beginning of each of said length intervals.

6. A method as defined in claim 1, wherein said distance S separating said first and second detectors is less than said integer multiple of said length interval by less than one of said repetitive length intervals.

7. Apparatus for measuring a repeat length L of a moving web, comprising:
    a frame;
    path defining means connected to said frame for defining a web path;
    means for advancing the web along said web path;
    mark forming means for forming a plurality of detectable marks along the length of the web, said marks being formed at a nominal repetitive length interval along the web, whereby a nominal value for said repeat length is selected such that said nominal repeat length is an integer multiple of said length interval;
    first and second detectors mounted to said frame and located along said web path, said detectors separated by a known distance S, each detector sensitive to movement there past of one of said detectable marks;
    means for measuring the speed of the moving web V;
    control means connected to said first and second detectors and said web speed measuring means, said control means operating in response to detection by said first detector of the movement of a mark there past, and detection by said second detector of the next movement of a mark there past, to:
    measure the time interval t separating said detections; and
    calculate the repeat length according to the relation $L = S + Vt$.

8. Apparatus as defined in claim 7, wherein said mark forming means includes means for punching a hole into the web at the beginning of each of said length intervals to form a series of equally spaced holes along the length of the web.

9. Apparatus as defined in claim 8, wherein said hole punching means includes a rotary line hole punch for operating on the web.

10. Apparatus as defined in claim 8, wherein said control means is operative in response to said first and second detectors such that said first detector and said second detector each detect the movement of one of said holes there past by first detecting the movement there past of a leading edge of said hole, and by detecting the movement there past of a trailing edge of said hole, said control means determining the midpoint between said leading and said trailing edges as a location for said hole.

11. Apparatus as defined in claim 7, wherein said mark forming means includes means for printing a mark on the web at the beginning of each of said length intervals.

12. Apparatus as defined in claim 7, wherein said first and second detectors are mounted to said frame such that the distance S separating said first and second detectors is less than said integer multiple of said length interval by less than one of said repetitive length intervals.

* * * * *